United States Patent
Zheng

(10) Patent No.: US 9,791,597 B2
(45) Date of Patent: Oct. 17, 2017

(54) CARBON NANOTUBE-BASED CURABLE COATING COMPOSITION PROVIDING ANTISTATIC ABRASION-RESISTANT COATED ARTICLES

(71) Applicant: ESSILOR INTERNATIONAL (COMPAGNIE GENERALE D'OPTIQUE), Charenton-le-Port (FR)

(72) Inventor: Haipeng Zheng, Dallas, TX (US)

(73) Assignee: ESSILOR INTERNATIONAL (COMPAGIE GENERALE D'OPTIQUE), Charenton-le-Pont (FR)

( * ) Notice: Subject to any disclaimer, the term of this patent is extended or adjusted under 35 U.S.C. 154(b) by 498 days.

(21) Appl. No.: 14/330,348

(22) Filed: Jul. 14, 2014

(65) Prior Publication Data
US 2014/0322508 A1  Oct. 30, 2014

Related U.S. Application Data

(63) Continuation of application No. 11/965,394, filed on Dec. 27, 2007, now abandoned.

(51) Int. Cl.
| | |
|---|---|
| G02B 1/10 | (2015.01) |
| G02B 1/16 | (2015.01) |
| G02B 1/14 | (2015.01) |
| C03C 17/00 | (2006.01) |
| C09D 5/24 | (2006.01) |
| C09D 7/12 | (2006.01) |
| C08K 3/04 | (2006.01) |
| C08K 7/00 | (2006.01) |

(52) U.S. Cl.
CPC .............. *G02B 1/16* (2015.01); *C03C 17/007* (2013.01); *C03C 17/008* (2013.01); *C09D 5/24* (2013.01); *C09D 7/1291* (2013.01); *G02B 1/105* (2013.01); *G02B 1/14* (2015.01); *C03C 2217/475* (2013.01); *C03C 2217/78* (2013.01); *C08K 3/04* (2013.01); *C08K 7/00* (2013.01); *Y10T 428/24975* (2015.01); *Y10T 428/26* (2015.01)

(58) Field of Classification Search
CPC .............. C03C 17/007; C03C 17/008; C03C 2217/475; C03C 2217/78; C09D 5/24; C09D 7/1291; G02B 1/105; C08K 3/04; C08K 7/00; Y10T 428/24975; Y10T 428/26
USPC .................................. 428/447, 216; 252/511
See application file for complete search history.

(56) References Cited

U.S. PATENT DOCUMENTS

| | | | |
|---|---|---|---|
| 5,908,585 A | 6/1999 | Shibuta ......................... 252/506 |
| 2002/0018886 A1* | 2/2002 | Matsufuji ................ C09D 4/00 428/328 |
| 2003/0158323 A1 | 8/2003 | Connell et al. ............... 524/495 |
| 2004/0197546 A1 | 10/2004 | Rinzler et al. ............ 428/311.51 |
| 2005/0209392 A1 | 9/2005 | Luo et al. ...................... 524/496 |
| 2005/0266208 A1 | 12/2005 | Raychaudhuri et al. |
| 2005/0267230 A1* | 12/2005 | Esaki .................... C08F 290/06 522/172 |
| 2006/0052509 A1 | 3/2006 | Saitoh ........................... 524/496 |
| 2006/0257638 A1* | 11/2006 | Glatkowski .............. C09D 5/24 428/292.1 |
| 2006/0274049 A1* | 12/2006 | Spath .................... B82Y 10/00 345/173 |

FOREIGN PATENT DOCUMENTS

| | | |
|---|---|---|
| EP | 0614957 | 9/1997 |
| JP | 2003-215307 | 7/2003 |
| JP | 2007-056125 | 3/2007 |
| JP | 2007-063481 | 3/2007 |
| JP | 2007-108362 | 4/2007 |
| JP | 2007155802 | 6/2007 |
| WO | WO 02/076724 | 10/2002 |
| WO | WO2007/089114 | 8/2007 |

OTHER PUBLICATIONS

Abrasion tests literature downloaded from http://rayvex.com/index.php/en/abrasion-tests on Jun. 11, 2013.*
Office Communication issued in Japanese Patent Application No. 2010-540125, dated Apr. 2, 2013.

* cited by examiner

*Primary Examiner* — Ling Choi
*Assistant Examiner* — Chun-Cheng Wang
(74) *Attorney, Agent, or Firm* — Norton Rose Fulbright US LLP

(57) ABSTRACT

The present invention relates to a curable composition, providing, upon curing, an abrasion-resistant, transparent, antistatic coating, comprising carbon nanotubes and a binder comprising at least one epoxysilane compound, preferably an epoxyalkoxysilane, and optionally fillers such as nanoparticles of non electrically conductive oxides and/or additional binder components such as tetraethoxysilane. The invention further relates to optical articles comprising a substrate, and, starting from the substrate, an abrasion- and/or scratch-resistant coating, and an antistatic coating formed by depositing directly onto said abrasion- and/or scratch-resistant coating the above referred curable composition. The obtained optical articles exhibit antistatic properties, high optical transparency with about 91-92% of transmittance, low haze and improved abrasion resistance.

19 Claims, No Drawings

CARBON NANOTUBE-BASED CURABLE COATING COMPOSITION PROVIDING ANTISTATIC ABRASION-RESISTANT COATED ARTICLES

CROSS-REFERENCE TO RELATED APPLICATIONS

This application is a continuation of U.S. patent application Ser. No. 11/965,394 filed Dec. 27, 2007, which is hereby incorporated by reference in its entirety.

BACKGROUND OF THE INVENTION

1. Field of the Invention

The present invention relates to curable compositions for preparing transparent antistatic abrasion-resistant coatings, articles exhibiting antistatic and abrasion-resistance properties coated therewith, in particular optical and ophthalmic lenses for eyeglasses, and a process to prepare such articles.

2. Description of Related Art

It is well known that optical articles, which are essentially composed of insulating materials, have a tendency to get charged with static electricity, especially when they are cleaned in dry conditions by rubbing their surface with a cloth or synthetic piece, for example a polyester piece (triboelectricity). The charges which are present at the surface of said optical articles create an electrostatic field capable of attracting and fixing, as long as the charge remains on optical articles, objects lying in the vicinity thereof (a few centimeters) that have a very little weight, generally small size particles such as dusts.

In order to decrease or suppress attraction of the particles, it is necessary to decrease the intensity of the electrostatic field, i.e. to decrease the number of static charges which are present at the surface of the article. This may be carried out by imparting mobility to the charges, for instance by introducing in the optical article a layer of a material inducing a high mobility of the charges. Materials inducing the highest mobility are conductive materials. Thus, a material having a high conductivity allows dissipating more rapidly charges.

It is known in the art that an optical article acquires antistatic (AS) properties owing to the incorporation at the surface thereof, in the stack of functional coatings, of at least one electrically conductive layer, which is called an antistatic layer. The presence of such a layer in the stack imparts to the article AS properties, even if the AS coating is interleaved between two coatings or two substrates which are not antistatic.

By "antistatic," it is meant the property of not retaining and/or developing an appreciable electrostatic charge. An article is generally considered to have acceptable antistatic properties when it does not attract or fix dust or small particles after one of its surfaces has been rubbed with an appropriate cloth. It is capable of quickly dissipating accumulated electrostatic charges.

The ability of a glass to evacuate a static charge created by rubbing with a cloth or any other electrostatic charge generation process (charge applied by corona . . . ) can be quantified by measuring the time required for said charge to be dissipated (charge decay time). Thus, antistatic glasses have a discharge time in the order of 100-200 milliseconds, while static glasses have a discharge time in the order of several tens seconds, sometimes even several minutes. A static glass having just been rubbed can thus attract surrounding dusts as long as it requires time to get discharged.

Only a limited number of materials are known in the art for preparing electrically conductive inorganic or organic layers having high optical transparency, i.e. a transmittance in the visible light of at least 90%. Known optically transparent antistatic coatings include vacuum-deposited metal or metal oxide films, for example films based on optionally doped (semi-)conductive metal oxides such as tin oxide doped with indium (ITO), tin oxide doped with antimony (ATO) or vanadium pentoxyde, spin-coated or self-assembled conductive polymer films, spin-coated or extruded carbon nanotube-based composite films.

ITO is the industry standard antistatic agent to provide optically transparent electrically conductive thin coatings, but the performance of ITO suffers when it is applied to plastics. These coatings are fragile and are readily damaged during bending or other stress inducing conditions. Conductive polymers represent the most investigated alternative to ITO coatings, but they still cannot match the optical and electrical performances of ITO and sometimes suffer from thermal and environmental stability problems in specific applications.

Currently, nanocomposites obtained by dispersing carbon nanotubes (CNT) into polymer matrices have brought many promising electrical and mechanical characters in various applications. However, they are still in their infancy and raise a lot of challenges, such as low loading percentage in polymer systems.

Many antistatic polymeric carbon nanotube-based composites have been explored, comprising polymeric resin and electrically conductive carbon fiber/nanotube, or a combination of carbon fiber/nanotube and non-conductive filler. The amount of the electrically conductive filler system utilized is dependent upon the desired electrical conductivity (surface and volume conductivity or resistivity) while preferably preserving intrinsic properties of the polymeric resin such as impact and flex modulus. The polymeric CNT-based composites can be applied in electromagnetic shielding, electrostatic dissipation or antistatic purposes in packaging, electronic components, housings for electronic components and automotive housings.

U.S. Pat. No. 5,908,585 discloses a glass substrate coated with a transparent electrically conductive film obtained from a coating composition containing, based on the total solid content, 0.1 wt % of CNT, 19.9 wt % of conductive nanoparticles of antimony-doped tin oxide and 80 wt % (as $SiO_2$) of hydrolyzed tetraethoxysilane. After high temperature baking at 350° C., the resulting coating is 200 nm-thick and has a surface resistivity of $3 \cdot 10^9 \Omega$/with an overall light transmittance of 92% and a haze value of 1.9%. The rest of coatings show even higher haze value than 2%. The abrasion-resistance properties were not investigated.

U.S. patent application No. 2003/158323 discloses an effective dispersion process of CNT into organic polymer matrices such as polyimide or poly(methyl methacrylate) to achieve high retention of optical transparency in the visible range. The final transmittance and the relative optical transparency are still lower than 90%.

U.S. patent application No. 2004/197546 discloses a process to achieve an optically transparent and electrically conductive CNT-based film disposed on a porous membrane through the filtration on said membrane of a dispersion comprising single walled carbon nanotubes and a surfactant or surface stabilizing polymer. However, it is difficult to make such CNT-based film with good quality on curved surfaces, which limits its application in ophthalmic lens industry.

U.S. patent application No. 2005/209392 describes flexible transparent carbon nanotube-based composites films obtained either by first applying a polymer binder onto a transparent substrate, following by a layer of CNT which penetrates into the binder, or by first coating a CNT layer onto the substrate and then applying the polymer binder which diffuses into the CNT network, or a combination of both to form a sandwich structure. The polymer binders can be thermoplastics or thermosets, including silicones, organosilicon polymers, fluorosilicones and inorganic-organic hybrid compounds such as heat-curable silanes, fluorosilanes and metal alkoxides. Although the films having a layer of CNT exhibit light transmittance of about 90-92% at the wavelength of 550 nm and small changes in sheet resistance after having been subjected to an abrasive treatment, the CNT layer show potential high haze after a spray process, due to the absence of binders or surfactants in the CNT dispersion, which is not investigated.

JP2007155802 describes a vacuum deposition process for depositing a thin film using a water repellent composition comprising a conductive material including CNT. The solution to be evaporated comprises large amounts of CNT, typically around 8% by weight. The purpose of this patent application is to apply a water repellent antistatic film. The abrasion resistance is not a specific purpose of the described technique.

The above-mentioned electrically conductive or antistatic coatings have shown very promising performances, but still have limitations with the process, their transparency, or haze values, which prevent them from some specific applications, especially in ophthalmic lens application. In addition, no antistatic coating has been reported to increase abrasion resistance.

SUMMARY OF THE INVENTION

An object of the invention is to provide novel curable coating compositions capable of imparting antistatic and abrasion resistance properties to an article, especially a transparent and low haze article, and overcoming the problems and disadvantages associated with current CNT-based compositions.

Another object of the invention is to provide electrically conductive coatings providing antistatic properties, having low haze and excellent scratch and/or abrasion resistance at the same time.

To achieve the foregoing objects, there is provided an optical article comprising a substrate, and, starting from the substrate:
an abrasion- and/or scratch-resistant coating,
an antistatic coating formed by depositing directly onto said abrasion- and/or scratch-resistant coating a curable composition comprising:
a) carbon nanotubes, and
b) a binder comprising at least one compound of formula:

                             (I)

or a hydrolyzate thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolyzable groups or hydrogen atoms, m and n' are integers such that m is equal to 1 or 2 and n'+m=1 or 2.

One embodiment of the invention is directed to a curable composition which provides, upon curing, an abrasion-resistant, transparent, antistatic coating, comprising:
a) carbon nanotubes, and
b) a binder comprising at least one compound of formula:

                             (I)

or a hydrolyzate thereof, wherein R, Y, X, m and n' are such as described above.

In one embodiment of the invention the binder further comprises at least one compound of formula:

                             (II)

or a hydrolyzate thereof, in which the R groups are identical or different and represent monovalent alkyl groups, the Z groups are identical or different and represent hydrolyzable groups or hydrogen atoms, and n is an integer equal to 0 or 1, with the proviso that the Z groups do not all represent a hydrogen atom when n=0.

The antistatic coatings of the present invention can be used in different stacks and still provide antistatic properties to an optical article, even if other functional coatings, especially antireflective coatings made of dielectric materials, are deposited over said coatings.

The invention also relates to a process for preparing a transparent antistatic optical article having improved abrasion resistance, comprising:
providing an optical article comprising a substrate,
applying onto the surface of the substrate an abrasion- and/or scratch-resistant coating, and
depositing directly onto said abrasion- and/or scratch-resistant coating the above described curable composition, and curing said composition.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When an optical article comprises one or more surface coatings, the phrase "to deposit a coating or layer onto the optical article" means that a coating or layer is deposited onto the outermost coating of the optical article, i.e. the coating which is the closest to the air.

A coating that is "on" a side of a lens is defined as a coating that (a) is positioned over that side, (b) need not be in contact with that side, i.e., one or more intervening coatings may be disposed between that side and said coating and (c) need not cover that side completely.

As used herein, a coating "A" that has been deposited "directly onto" a coating "B" means that (a) coatings "A" and "B" are in contact with each other in the final optical article, i.e. no intervening coating may be disposed between them; and (b) coating "A" has been deposited using any means of depositing (such as spin coating, dip coating, or vacuum deposition) and need not cover coating "B" completely.

The optical article prepared according to the present invention is a transparent optical article, preferably a lens or lens blank, and more preferably an ophthalmic lens or lens blank. The optical articles may be coated on their convex main side (front side), concave main side (back side), or both sides with the stack abrasion- and/or scratch-resistant coating/antistatic coating according to the invention.

Herein, the term "lens" means an organic or inorganic glass lens, comprising a lens substrate which may be coated with one or more coatings of various natures.

The lens substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates and diethylene glycol bis(allylcarbonate) copolymers, in particular substrates made of polycarbonate.

The optical article comprising a substrate used herein may also be a carrier onto which the abrasion- and/or scratch-resistant coating and the antistatic coating are stored. They can be transferred later from the carrier onto the substrate of e.g. an optical lens. The carrier which may be coated according to the present process may optionally bear at least one functional coating. Obviously, the coatings are applied on the surface of the carrier in the reverse order with regard to the desired order of the coating stack on the lens substrate.

The surface of the article onto which the abrasion- and/or scratch-resistant coating will be deposited may optionally be subjected to a pre-treatment step intended to improve adhesion, for example a high-frequency discharge plasma treatment, a glow discharge plasma treatment, a corona treatment, an electron beam treatment, an ion beam treatment, an acid or base treatment.

The abrasion- and/or scratch-resistant coating according to the invention may be deposited onto a naked substrate or onto the outermost coating layer of the substrate if the substrate is coated with surface coatings.

According to the invention, the optical article may comprise a substrate coated with various coating layers, chosen from, without limitation, an impact-resistant coating (impact resistant primer), a polarized coating, a photochromic coating, a dyeing coating, or several of those coatings.

The abrasion- and/or scratch-resistant coating for use in the present invention is defined as a coating which improves the abrasion- and/or scratch-resistance of the finished optical article as compared to a same optical article but without the abrasion- and/or scratch-resistant coating. According to the invention, any known optical abrasion- and/or scratch-resistant coating composition may be used herein.

Preferred abrasion- and/or scratch-resistant coatings are (meth)acrylate based coatings and silicon-containing coatings.

(Meth)acrylate based coatings are typically UV-curable. The term (meth)acrylate means either methacrylate or acrylate.

The main component of the (meth)acrylate based curable coating composition may be chosen from monofunctional (meth)acrylates and multifunctional (meth)acrylates such as difunctional (meth)acrylates; trifunctional (meth)acrylates; tetrafunctional (meth)acrylates, pentafunctional(meth)acrylates, hexafunctional (meth)acrylates.

Examples of monomers which may be used as main components of (meth)acrylate based coating compositions are:
  monofunctional (meth)acrylates: Allyl methacrylate, 2-ethoxyethyl acrylate, 2-ethoxyethyl methacrylate, caprolactone acrylate, isobornyl methacrylate, lauryl methacrylate, polypropylene glycol monomethacrylate.
  difunctional (meth)acrylates: 1,4-butanediol diacrylate, 1,4-butanediol dimethacrylate, 1,6-hexanediol diacrylate, 1,6-hexanediol dimethacrylate, ethoxylated bisphenol A diacrylate, polyethylene glycol di(meth)acrylates such as polyethylene glycol diacrylate, tetraethylene glycol diacrylate, polyethylene glycol dimethacrylate, polyethylene glycol diacrylate, tetraethylene glycol diacrylate, tripropylene glycol diacrylate, neopentyl glycol diacrylate, tetraethylene glycol dimethacrylate, diethylene glycol diacrylate.
  trifunctional (meth)acrylates: Trimethylolpropane trimethacrylate, Trimethylolpropane triacrylate, pentaerythritol triacrylate, ethoxylated trimethylolpropane triacrylate, trimethylolpropane trimethacrylate.
  tetra to hexa(meth)acrylates: Dipentaerythritol pentaacrylate, pentaerythritol tetraacrylate, ethoxylated pentaerythritol tetraacrylate, pentaacrylate esters.

Silicon-containing abrasion- and/or scratch-resistant coatings are preferably sol-gel coatings, which may be obtained by curing a precursor composition containing silanes or hydrolyzates thereof. The sol-gel silicon based coating compositions which may be used are homogeneous mixtures of a solvent, a silane and/or an organosilane, optionally a surfactant, and optionally a catalyst which are processed to form a coating suitable for optical application. The term "homogeneous" as used herein refers to a form which has a uniform or similar structure throughout and is given the ordinary meaning known to persons skilled in the art.

The preferred abrasion- and/or scratch-resistant coatings are epoxytrialkoxysilane-based hard coatings, more preferably γ-glycidoxypropyl-trimethoxysilane-based hard coatings.

A particularly preferred curable composition for an abrasion- and/or scratch-resistant coating comprises a surfactant, a hydrolyzate of an epoxytrialkoxysilane and dialkyl-dialkoxysilane, colloidal mineral fillers and a catalytic amount of an aluminum-based curing catalyst, the remaining of the composition being essentially comprised of solvents typically used for formulating abrasion- and/or scratch-resistant compositions. Typical ingredients which may be used in such abrasion- and/or scratch-resistant coating composition are disclosed in French patent application FR 2702486, which is incorporated herein by reference. Especially preferred silicon based abrasion- and/or scratch-resistant coating compositions are those comprising as the main constituents a surfactant, a hydrolyzate of γ-glycidoxypropyl-trimethoxysilane (GLYMO) and dimethyl-diethoxysilane (DMDES), colloidal silica and a catalytic amount of aluminum acetylacetonate.

The abrasion- and/or scratch-resistant coating preferably has a thickness of at least 1 µm, more preferably at least 1.5 microns, still more preferably at least 2 microns, even better at least 3 microns, and preferably less than 10 µm, more preferably less than 5 µm.

The abrasion- and/or scratch-resistant coating is preferably deposited onto a substrate already coated with an impact-resistant primer coating.

The impact-resistant coating which may be used in the present invention can be any coating typically used for improving impact resistance of a finished optical article. This coating generally enhances adhesion of the abrasion and/or scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth)acrylic based coatings and polyurethane based coatings, in particular coatings made from a latex composition such as a poly(meth)acrylic latex, a polyurethane latex or a polyester latex.

The inventive curable coating composition directly applied onto the above-described abrasion- and/or scratch-resistant coating provides, upon curing, a functional transparent coating having antistatic properties and abrasion resistance. It will be sometimes referred to in this patent application as the "antistatic composition".

Said curable composition comprises CNT and a binder comprising at least one compound of formula:

$$R_n Y_m Si(X)_{4-n'-m} \quad (I)$$

or hydrolyzates thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolyzable groups or hydrogen atoms, m and n' are integers such that m is equal to 1 or 2 and n'+m=1 or 2.

The X groups may independently and without limitation represent H, alkoxy groups $-O-R^1$, wherein $R^1$ preferably represents a linear or branched alkyl or alkoxyalkyl group, preferably a $C_1$-$C_4$ alkyl group, acyloxy groups $-O-C(O)R^3$, wherein $R^3$ preferably represents an alkyl group, preferably a $C_1$-$C_6$ alkyl group, and more preferably a methyl or ethyl group, halogen groups such as Cl and Br, amino groups optionally substituted with one or two functional groups such as an alkyl or silane group, for example the $NHSiMe_3$ group, alkylenoxy groups such as the isopropenoxy group, trialkylsiloxy groups, for example the trimethylsiloxy group.

The X groups are preferably alkoxy groups, in particular methoxy, ethoxy, propoxy or butoxy, more preferably methoxy or ethoxy. In this case, compounds of formula I are alkoxysilanes.

The integers n and m define three groups of compounds I: compounds of formula $RYSi(X)_2$, compounds of formula $Y_2Si(X)_2$, and compounds of formula $YSi(X)_3$. Among these compounds, epoxysilanes having the formula $YSi(X)_3$ are preferred.

The monovalent R groups linked to the silicon atom through a Si—C bond are organic groups. These groups may be, without limitation, hydrocarbon groups, either saturated or unsaturated, preferably $C_1$-$C_{10}$ groups and better $C_1$-$C_4$ groups, for example an alkyl group, preferably a $C_1$-$C_4$ alkyl group such as methyl or ethyl, an aminoalkyl group, an alkenyl group, such as a vinyl group, a $C_6$-$C_{10}$ aryl group, for example an optionally substituted phenyl group, in particular a phenyl group substituted with one or more $C_1$-$C_4$ alkyl groups, a benzyl group, a (meth)acryloxyalkyl group, or a fluorinated or perfluorinated group corresponding to the above cited hydrocarbon groups, for example a fluoroalkyl or perfluoroalkyl group, or a (poly)fluoro or perfluoro alkoxy[(poly)alkyloxy]alkyl group.

Preferably The R groups do not contain fluorine. More preferably, compounds of formula I do not contain fluorine.

The most preferred R groups are alkyl groups, in particular $C_1$-$C_4$ alkyl groups, and ideally methyl groups.

The monovalent Y groups linked to the silicon atom through a Si—C bond are organic groups since they contain at least one epoxy function, preferably one epoxy function. By epoxy function, it is meant a group of atoms, in which an oxygen atom is directly linked to two adjacent carbon atoms or non adjacent carbon atoms comprised in a carbon containing chain or a cyclic carbon containing system. Among epoxy functions, oxirane functions are preferred, i.e. saturated three-membered cyclic ether groups.

Epoxysilanes compounds of formula I provide a highly cross-linked matrix. The preferred epoxysilanes have an organic link between the Si atom and the epoxy function that provides a certain level of flexibility.

The preferred Y groups are groups of formulae III and IV:

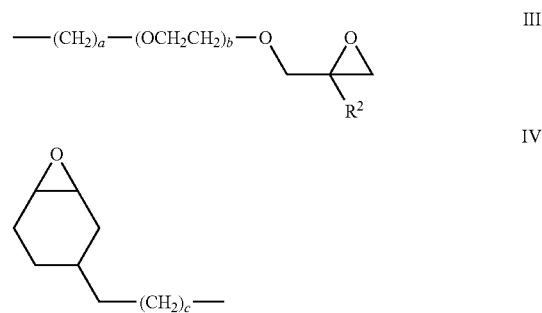

in which $R^2$ is an alkyl group, preferably a methyl group, or a hydrogen atom, ideally a hydrogen atom, a and c are integers ranging from 1 to 6, and b is 0, 1 or 2.

The preferred group having formula III is the γ-glycidoxypropyl group ($R^2$=H, a=3, b=0) and the preferred (3,4-epoxycyclohexyl)alkyl group of formula IV is the β-(3,4-epoxycyclohexyl)ethyl group (c=1). The γ-glycidoxyethoxypropyl group may also be employed ($R^2$=H, a=3, b=1).

Preferred epoxysilanes of formula I are epoxyalkoxysilanes, and most preferred are those having one Y group and three alkoxy X groups. Particularly preferred epoxytrialkoxysilanes are those of formulae V and VI:

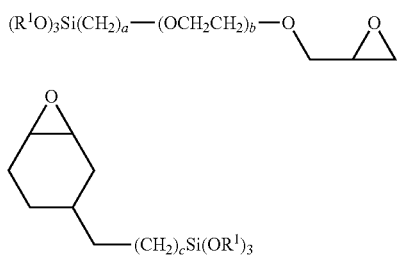

in which R¹ is an alkyl group having 1 to 6 carbon atoms, preferably a methyl or ethyl group, and a, b and c are such as defined above.

Examples of such epoxysilanes include but are not limited to glycidoxy methyl trimethoxysilane, glycidoxy methyl triethoxysilane, glycidoxy methyl tripropoxysilane, α-glycidoxy ethyl trimethoxysilane, α-glycidoxy ethyl triethoxysilane, β-glycidoxy ethyl trimethoxysilane, β-glycidoxy ethyl triethoxysilane, β-glycidoxy ethyl tripropoxysilane, α-glycidoxy propyl trimethoxysilane, α-glycidoxy propyl triethoxysilane, α-glycidoxy propyl tripropoxysilane, β-glycidoxy propyl trimethoxysilane, β-glycidoxy propyl triethoxysilane, β-glycidoxy propyl tripropoxysilane, γ-glycidoxy propyl trimethoxysilane, γ-glycidoxy propyl triethoxysilane, γ-glycidoxy propyl tripropoxysilane, 2-(3,4-epoxycyclohexyl)ethyltrimethoxysilane, 2-(3,4-epoxycyclohexyl)ethyltriethoxysilane. Other useful epoxytrialkoxysilanes are described in U.S. Pat. No. 4,294,950, U.S. Pat. No. 4,211,823, U.S. Pat. No. 5,015,523, EP 0614957 and WO 94/10230, which are hereby incorporated by reference. Among those silanes, γ-glycidoxypropyltrimethoxysilane (GLYMO) is preferred.

Preferred epoxysilanes of formula I having one Y group and two X groups include, but are not limited to, epoxydialkoxysilanes such as γ-glycidoxypropyl-methyl-dimethoxysilane, γ-glycidoxypropyl bis(trimethylsilyloxy) methylsilane, γ-glycidoxypropyl-methyl-diethoxysilane, γ-glycidoxypropyl-methyl-diisopropenoxysilane, and γ-glycidoxyethoxypropyl-methyl-dimethoxysilane. When epoxy dialkoxysilanes are used, they are preferably combined with epoxytrialkoxysilanes such as those described above, and are preferably employed in lower amounts than said epoxytrialkoxysilanes.

In one embodiment of the invention, the binder of the antistatic composition further comprises at least one compound of formula:

$$R_nSi(Z)_{4-n} \quad (II)$$

or a hydrolyzate thereof, in which the R groups are identical or different and represent monovalent alkyl groups, the Z groups are identical or different and represent hydrolyzable groups or hydrogen atoms, and n is an integer equal to 0, 1 or 2, preferably 0 or 1, with the proviso that the Z groups do not all represent a hydrogen atom when n=0, and preferably do not all represent a hydrogen atom.

Compounds of formula II or their hydrolyzates may be used to improve the cross-linking of the coating obtained from the curable composition of the invention, thereby providing higher hardness and abrasion-resistance.

Silanes of formula II bear three to four Z groups directly linked to the silicon atom, each leading to an OH group upon hydrolysis and one or two monovalent organic R groups linked to the silicon atom. It is worth noting that SiOH bonds may be initially present in the compounds of formula II, which are considered in this case as hydrolyzates. Hydrolyzates also encompass siloxane salts.

The Z groups may represent hydrolyzable groups independently chosen from the hydrolyzable groups which have been previously cited when describing the X groups. Preferably, the Z groups are hydrolyzable groups which are identical or different.

The most preferred R groups are $C_1$-$C_4$ alkyl groups, such as methyl, ethyl, n-propyl, i-propyl, n-butyl, i-butyl, preferably methyl groups.

Most preferred compounds of formula II are those having formula $Si(Z)_4$. Examples of such compounds are tetraalkoxysilanes such as tetraethoxysilane $Si(OC_2H_5)_4$ (TEOS), tetramethoxysilane $Si(OCH_3)_4$ (TMOS), tetra(n-propoxy)silane, tetra(i-propoxy)silane, tetra(n-butoxy)silane, tetra(sec-butoxy)silane or tetra(t-butoxy)silane, preferably TEOS.

Compounds of formula II may also be chosen from compounds of formula $RSi(Z)_3$, for example methyl triethoxysilane (MTEOS).

Silanes present in the curable antistatic composition may be hydrolyzed partially or totally, preferably totally. Hydrolyzates can be prepared in a known manner, e.g. such as disclosed in FR 2702486 and U.S. Pat. No. 4,211,823. Hydrolysis catalysts such as hydrochloric acid or acetic acid may be used to promote the hydrolysis reaction over the condensation reaction.

The binder, which includes compounds of formula I and II but not fillers, is generally comprised in the antistatic coating composition in an amount ranging from 1 to 20% by weight based on the total weight of the antistatic composition, preferably from 2 to 15%. When the antistatic composition does not comprise fillers such as nanoparticles, it preferably comprises from 5 to 15% of binder by weight based on the total weight of the antistatic composition.

Compounds of formula I are generally used in an amount ranging from 1 to 10% by weight based on the total weight of the antistatic composition, preferably from 2 to 8%. The ratio of (theoretical dry extract weight of compounds of formula I)/(theoretical dry extract weight of the composition) preferably ranges from 20 to 100%, more preferably from 25 to 80%, even better from 30 to 70%.

When compounds of formula II are present, they are generally used in an amount ranging from 1 to 10% by weight based on the total weight of the antistatic composition, preferably from 2 to 8%. When compounds of formula II are present, the ratio of (theoretical dry extract weight of compounds of formula II)/(theoretical dry extract weight of the composition) preferably ranges from 15 to 60%, more preferably from 20 to 55%, even better from 25 to 50%.

In some embodiments, the antistatic composition does not comprise any compound of formula II. Preferably, the antistatic composition does not comprise any compounds of formula II when fillers are present in said composition.

In preferred embodiments, the antistatic composition does not comprise any fluorinated compound, except usual surfactants used in very low amounts (Typically less than 0.5% by weight in the liquid coating composition).

Carbon nanotubes (CNT) contained in the antistatic composition refer to tubular structures grown with a single wall or multi-wall, which can be thought of as a rolled up sheet formed of a plurality of hexagons, the sheet formed by combining each carbon atom thereof with three neighboring carbon atoms. The carbon nanotubes used in the invention have preferably a diameter on the order of half nanometer to less than 10 nanometers. Carbon nanotubes can function as either an electrical conductor, similar to a metal, or a semiconductor, according to the orientation of the hexagonal carbon atom lattice relative to the tube axis and the diameter of the tubes. Within the scope of the present invention, the term CNT(s) designates both single wall carbon nanotubes and multi-wall carbon nanotubes such as double wall carbon nanotubes. CNT are preferably single wall carbon nanotubes.

Preferably, commercially available CNT used are purified to remove the large catalyst particles which are utilized in their formation.

Incorporation of CNT into the present coating composition so as to form optically transparent films which exhibit uniform optical density across their area can be carried out according to methods well known to those skilled in the art. Typically, CNT dispersions are prepared by placing CNT into a solvent containing a sufficient concentration of stabilizing agent to suspend the CNT. The solvent is preferably a polar solvent, like water, alcohol, or a mixture of water and alcohol. The CNT concentration in the dispersion is preferably less than 1 weight percent (wt %) and preferably mono-dispersed CNT coatings having high optical transparency and low haze are achieved. The CNT dispersion is generally mixed mechanically with a homogenizer for 10 min to 1 h, followed by ultrasonic treatment for 10 min to 30 min. The combination of high shear mixing and ultrasonic treatment gives dispersions of higher quality than those obtained using a single mixing tool. The dispersed CNT solutions are generally then centrifuged or placed under sedimentation for over one day. CNT agglomerates or bundles are preferably removed to get a uniform dispersion, allowing obtaining dispersions in the range of 0.001-0.02 wt % of CNT.

The stabilizing agents which may be used to prepare CNT dispersions are not particularly limited and can comprise a variety of synthetic or naturally occurring surfactants include, without limitation, sodium dodecyl sulfate (SDS), octylphenol ethylene oxide condensates (octyl-phenoxy-polyethoxyethanol compounds) such as Nonidet P-40 (NP-40) or Triton® surfactants manufactured by the Dow Chemical Corporation such as TRITON X-100®, TRITON X-305® or TRITON X-405®, poloxamers (e.g., the Pluronic® series of detergents and Poloxamer 188®, which is defined as $HO(C_2H_4O)_a(C_3H_6O)_b(C_2H_4O)_aH$, with the ratio of a to b being 80 to 27 and the molecular weight being in the range of 7680 to 9510), ammonium bromides and chlorides (e.g., cetyltrimethylammonium bromide, tetradecylammonium bromide and dodecylpyrimidinium chloride), polyoxyethylene sorbitol esters (e.g., TWEEN® and EMASOL® series detergents), and naturally occurring emulsifying agents such as cyclodextrins.

Production of stable aqueous dispersions of carbon nanotubes is described in more detail in U.S. Pat. No. 6,878,361.

In general, CNT are used in the composition in an amount ranging from 0.002 to 0.015%, preferably from 0.004 to 0.012% by weight based on the total weight of the antistatic composition. Preferably, the weight ratio defined as weight of carbon nanotubes/weight of binder ranges from 0.00025 to 0.01, more preferably from 0.0005 to 0.008, even better from 0.0008 to 0.006, the best ranging from 0.0008 to 0.0045.

By weight of binder, it is meant the theoretical dry extract weight of binder in the composition.

Preferably, the ratio weight of carbon nanotubes/theoretical dry extract weight of the antistatic composition ranges from 0.0002 to 0.008, more preferably from 0.0005 to 0.005.

By "theoretical dry extract weight of a component in a composition," it is meant the theoretical weight of solid matter of this component in said composition, i.e. its weight contribution to the theoretical dry extract weight of said composition.

The theoretical dry extract weight of a composition is defined as the sum of the theoretical dry extract weights of each of its components. As used herein, the theoretical dry extract weight of compounds of formula I or II is the calculated weight in $R_{n'}Y_mSi(O)_{(4-n'-m)/2}$ or $R_nSi(O)_{(4-n)/2}$ units, wherein R, Y, n, n' and m are such as defined previously.

In some embodiments, the antistatic composition comprises fillers, generally nanoparticles (or nanocrystals), for increasing the hardness and/or the refractive index of the cured coating. The nanoparticles may be organic or inorganic. A mixture of both can also be used. Preferably, inorganic nanoparticles are used, especially metallic or metalloid oxide, nitride or fluoride nanoparticles, or mixtures thereof.

By "nanoparticles", it is meant particles which diameter (or longest dimension) is lower than 1 µm, preferably lower than 150 nm and still better lower than 100 nm. In the present invention, fillers or nanoparticles preferably have a diameter ranging from 2 to 100 nm, more preferably from 2 to 50 nm, and even better from 5 to 50 nm.

Suitable inorganic nanoparticles are for example nanoparticles of aluminum oxide $Al_2O_3$, silicon oxide $SiO_2$, zirconium oxide $ZrO_2$, titanium oxide $TiO_2$, antimony oxide $Sb_2O_5$, tantalum oxide $Ta_2O_5$, zinc oxide, tin oxide $SnO_2$, indium oxide, cerium oxide, $Si_3N_4$, $MgF_2$ or their mixtures.

It is also possible to use particles of mixed oxides or composite particles, for example those having a core/shell structure. Using different types of nanoparticles allows making hetero-structured nanoparticles layers.

Preferably, the nanoparticles are particles of aluminum oxide, tin oxide, zirconium oxide or silicon oxide $SiO_2$, more preferably $SiO_2$ nanoparticles. Mineral fillers are preferably used under colloidal form, i.e. under the form of fine particles dispersed in a dispersing medium such as water, an alcohol, a ketone, an ester or mixtures thereof, preferably an alcohol.

When fillers are present, they are generally used in an amount ranging from 0.5 to 10% by weight based on the total weight of the antistatic composition, preferably from 1 to 8%. When fillers are present, the ratio of (theoretical dry extract weight of fillers)/(theoretical dry extract weight of the composition) preferably ranges from 25 to 80%, more preferably from 30 to 75%, even better from 40 to 70%. The theoretical dry extract weight of fillers is generally equal to the weight of solid fillers.

In some embodiments, the antistatic composition does not comprise any filler such as nanoparticles. Preferably, the antistatic composition does not comprise any filler when compounds of formula II are present in said composition.

One of the difficulties in the preparation of a composition exhibiting at the same time electric conductivity properties along with hardness and/or abrasion-resistance properties is to get a homogeneous dispersion having small size particles capable of being used in the optic field, especially in the ophthalmic field, that is to say exhibiting a level of haze which does not prevent it from being used in this field. This means that the fillers must not be substantially agglomerated with the CNT.

The antistatic composition optionally comprises a catalytic amount of at least one curing catalyst, so as to accelerate the curing step. Examples of curing catalysts are photo-initiators that generate free radicals upon exposure to ultraviolet light or heat such as organic peroxides, azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof.

The antistatic composition may also comprise a curing catalyst such as aluminum acetylacetonate, a hydrolyzate thereof or carboxylates of metals such as zinc, titanium, zirconium, tin or magnesium. Condensation catalysts such as saturated or unsaturated polyfunctional acids or acid anhydrides may also be used, in particular maleic acid, itaconic acid, trimellitic acid or trimellitic anhydride. Numerous examples of curing and/or condensation catalysts are given in "Chemistry and Technology of the Epoxy Resins", B. Ellis (Ed.) Chapman Hall, New York, 1993 and "Epoxy Resins Chemistry and Technology" $2^{eme}$ edition, C. A. May (Ed.), Marcel Dekker, New York, 1988.

In general, the catalysts described above are used according to the invention in an amount ranging from 0.01 to 10%, preferably from 0.1 to 5% by weight based on the total weight of the curable antistatic composition.

The antistatic composition according to the invention may also contain various additives conventionally used in polymerizable compositions, in conventional proportions. These additives include stabilizers such as antioxidants, UV light absorbers, light stabilizers, anti-yellowing agents, adhesion promoters, dyes, photochromic agents, pigments, rheology modifiers, lubricants, cross-linking agents, photo-initiators fragrances, deodorants and additional surfactants.

The remaining of the antistatic composition is essentially comprised of solvents, which may be chosen from water or water-miscible alcohols, e.g. methanol, ethanol, 2-butanol, or mixtures of water and water-miscible alcohols.

The ratio of theoretical dry extract weight of the composition/total weight of the composition according to the invention is generally lower than 30%, and preferably ranges from 1 to 20%, more preferably from 1.5 to 15%, even better from 2 to 10%.

The coating compositions of the invention allow to achieve a sufficient electrical conduction, so that it is not necessary to add additional conductive compounds.

In a preferred embodiment, the antistatic composition according to the invention does not contain conductive polymers, such as, without limitation, polyanilines, polypyrroles, polythiophenes, polyselenophenes, polyethylene-imines, poly(allylamine) or polyvinylphenylene.

In another preferred embodiment, the antistatic composition according to the invention comprises less than 1% by weight based on the total weight of the antistatic composition, of electrically conductive fillers, which are generally oxides such as ITO, ATO, zinc antimonate ($ZnSb_2O_6$), indium antimonate ($InSbO_4$), or $SrTiO_3$, preferably less than 0.5% by weight and even better 0%. Within the meaning of the invention, oxides such as $SiO_2$, $Al_2O_3$, $ZrO_2$, $SnO_2$ and mixtures thereof are not considered to be electrically conductive oxides (fillers).

Once the antistatic composition according to the invention has been prepared, it is deposited onto the above described abrasion- and/or scratch-resistant coating by any of the methods used in liquid coating technology such as, for example, spray coating, spin coating, flow coating brush coating, dip coating or roll-coating. Spin coating and dip coating are the preferred methods. The composition can be applied by a series of successive layers or thin coats onto the substrate to achieve the desired thickness. The antistatic composition is then cured according to known methods.

In the final optical article, the thickness of the inventive antistatic coating preferably ranges from 50 nm to 2 μm, more preferably from 100 nm to 1.5 μm, even better from 100 nm to 1 μm.

It is possible to apply other coatings onto the antistatic coating, such as an antireflection coating and/or an antifouling top coat. Other coatings such as a polarized coating, a photochromic coating, a dyeing coating or an adhesive layer, for example an adhesive polyurethane layer, may also be applied onto said antistatic coating.

Articles obtained according to the invention will be now described in more details.

The present invention provides optical articles having charge decay times ≤500 milliseconds, preferably ≤200 milliseconds and better ≤150 milliseconds.

Surface resistivity of optical articles provided by the present invention is lower than or equal to $10^{12} \Omega/\square$, preferably lower than or equal to $5 \cdot 10^{11} \Omega/\square$, still better lower than or equal to $10^{11} \Omega/\square$, and generally higher than or equal to $10^6 \Omega/\square$.

It is generally considered that an article exhibits antistatic properties when its surface resistivity is lower than or equal to $10^{12} \Omega/\square$. By surface resistivity of the optical article, it is meant the surface resistivity which is measured at the surface of the final optical article on its main face coated with both the abrasion- and/or scratch-resistant coating and the antistatic coating described above.

The final optical articles preferably do not absorb light in the visible range (or little), which means herein that when coated on one side with the abrasion- and/or scratch-resistant coating and the antistatic coating according to the invention, the optical article has a luminous absorption in the visible range due to both coatings of preferably 1% or less, more preferably less than 1%, and/or a relative light transmission factor in the visible spectrum, Tv (or ζv), preferably higher than 90%, more preferably higher than 91%, and even better higher than 92%. Preferably, both features are simultaneously satisfied and can be reached by carefully controlling thicknesses of the coatings.

As used herein, the Tv factor is such as defined in the standard NF EN 1836 and corresponds to the 380-780 nm wavelength range.

In an alternative embodiment, the optical article may be tinted or dyed and absorb light in the visible range.

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably less than 0.8%, more preferably less than 0.5%, still more preferably less than 0.3% and even better less than 0.2%.

Optical articles according to the invention also have improved abrasion resistance, compared to substrates which do not comprise the inventive antistatic abrasion-resistant coating.

Whatever the embodiment of the present invention, the antistatic abrasion resistant coating of the invention shows many advantages compared to other antistatic coating systems, including applicability to most substrates with excellent adhesion, in particular plastic substrates, and high electrical conductivity.

The invention also relates to a process for preparing an abrasion- and/or scratch-resistant antistatic optical article, comprising:

providing an optical article comprising a substrate, applying onto the surface of the substrate an abrasion- and/or scratch-resistant coating, and depositing directly onto said abrasion- and/or scratch-resistant coating the above described curable composition, and curing said composition.

The present optical articles can be processed simply and at low temperature (≤100° C.), using environment friendly solvents (alcohol or water/alcohol co-solvent). The present process is flexible and allows incorporation of other functional coatings onto the substrate. It is more convenient than the process disclosed in U.S. pat. appl. No. 2005/209392, in which two steps are necessary to form the antistatic coating.

The present invention can be used in the ophthalmic field to prepare antistatic lenses, but also for general antistatic purpose in photographic films, electronics or food packaging, and imaging materials.

Now, the present invention will be described in more detail with reference to the following examples. These examples are provided only for illustrating the present invention and should not be construed as limiting the scope and spirit of the present invention.

EXAMPLES

1. Testing Methods

The following test procedures were used to evaluate the optical articles prepared according to the present invention. Three samples for each system were prepared for measurements and the reported data were calculated in the average of three data.

a) Charge Decay Time

In the present patent application, charge decay times of optical articles which have been beforehand subjected to a corona discharge at 9000 volts were measured using JCI-155v5 Charge Decay Test Unit from John Chubb Instrumentation at 25.4° C. and 50% relative humidity.

The unit was set up with JCI-176 Charge Measuring Sample Support, JCI-191 Controlled Humidity Test Chamber, JCI-192 Dry Air Supply Unit and Calibration of voltage sensitivity and decay time measurement performance of JCI-155 to the methods specified in British Standard and Calibration voltage measurements and resistor and capacitor values traceable to National Standards.

b) Surface Resistivity

Surface resistivity of optical articles coated according to the invention was measured at 23° C. and 55% relative humidity using modified concentric ring probe Model 863 (2.5") for curve lens substrate with variable diopters and 6487 Laboratory Digital Resistance/Current Meter (100V was applied) from Electro-Tech Systems.

c) Dry Adhesion Test

Dry adhesion of the coatings was measured using the cross-hatch adhesion test according to ASTM D3359-93, by cutting through the coatings a series of 5 lines, spaced 1 mm apart with a razor, followed by a second series of 5 lines, spaced 1 mm apart, at right angles to the first series, forming a crosshatch pattern comprising 25 squares. After blowing off the crosshatch pattern with an air stream to remove any dust formed during scribing, clear cellophane tape (3M SCOTCH® n° 600) was then applied over the crosshatch pattern, pressed down firmly, and then rapidly pulled away from coating in a direction perpendicular to the coating surface. Application and removal of fresh tape was then repeated two additional times. Adhesion is rated as follows (0 is the best adhesion, 1-4 is in the middle, and 5 is the poorest adhesion):

| Adhesion score | Squares removed | Area % left intact |
| --- | --- | --- |
| 0 | 0 | 100 |
| 1 | <1 | >96 |
| 2 | 1 to 4 | 96-84 |
| 3 | >4 to 9 | 83-64 |
| 4 | >9 to 16 | 63-36 |
| 5 | >16 | <36 | d) Determination of the Abrasion Resistance ("ISTM Bayer Test" or "Bayer Alumina")

The Bayer abrasion test is a standard test used to determine the abrasion resistance of curved/lens surfaces. Determination of the Bayer value was performed in accordance with the standards ASTM F735-81 (Standard Test Method for Abrasion Resistance of Transparent Plastics and Coatings Using Oscillating Sand Method).

Per this test, a coated lens and an uncoated lens (reference lens of similar curvature, diameter, thickness and diopter) were subjected to an oscillating abrasive sand box (approximately 500 g of aluminum oxide ZF 152412 supplied by Specialty Ceramic Grains, former Norton Materials) for 300 cycles of abrasion in 2 minutes. Only fresh sand is used for each measurement.

The haze H of both the reference and coated sample were then measured with a Haze Guard Plus meter, in accordance with ASTM D1003-00, before and after the test has been performed. The results are expressed as a calculated ratio of the reference lens to the coated lens (Bayer value=$H_{standard}/H_{sample}$). The Bayer value is a measure of the performance of the coating, with a higher value meaning a higher abrasion resistance.

e) Haze Value, Tv and Thickness

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's directions. Next, the sample was placed on the transmission light beam of the pre-calibrated meter and the haze value was recorded from three different specimen locations and averaged. Tv was measured using the same device.

Thickness of the films was evaluated by ellipsometer (thickness <1 μm) equipped with M-44™, EC-270 and LPS-400 with 75W Xenon Light Source from J. A. Woollam Co. Inc. or with a Metricon Model 2010 Prism Coupler apparatus (thickness >1 μm) from Metricon Corporation.

2. Experimental Details a) General Procedure for Preparation of Antistatic Coating Compositions 5 g of surfactant Triton X-305® were dissolved in 495 g of deionized water, in which 300 mg of CNT powder (Purified HiPco) were subsequently introduced. A homogenizer was then used to mix the CNT dispersion for 20 minutes, and a high power sonic horn (500-watt) operated at 20 kHz was applied for 15 minutes of ultrasonic treatment. The dispersion was subjected to sedimentation for two days and contained about 0.01 wt % of CNT after removal of the precipitates. It was stable for more than 1 month without any precipitates or agglomerates.

Coating solutions were prepared by mixing GLYMO, TEOS (when present), HCl and $SiO_2$ or $SnO_2$ nanoparticle aqueous dispersion (when present) in methanol under agitation for 12 h, followed by dispersing with 2-butanol, Al(AcAc)$_3$, a surfactant (FC-430), and the above described CNT dispersion.

CNT powder was purchased from Carbon Nanotechnologies, Inc., which comprises purified carbon nanotubes of less than 15 wt % ash content, grown by the HiPCO method (High Pressure catalytic decomposition of Carbon monOxide) and prepared from laser ablation. Triton X-305® was purchased from Dow Chemical Corporation; the SnO$_2$ nanoparticles aqueous dispersion (SN15ES, 15 wt % of nanoparticles, 10-15 nm diameter) was purchased from NYA-COL Nanotechnologies, Inc.; the SiO$_2$ nanoparticles aqueous dispersions (NH-1530, 2540, 4030, 30 or 40 wt % of nanoparticles, diameter of 15, 25 or 40 nm) were purchased from Silco International Inc. FC-430 surfactant was purchased from 3M.

b) Preparation of Coated Optical Articles

The optical articles used in the examples were round lenses (plano or −2.00 with 68 mm of diameter) comprising either an ORMA® substrate (obtained by polymerizing CR-39® diethylene glycol bis(allyl carbonate) monomer), or Airwear® ESSILOR production lenses comprising a polycarbonate substrate.

In examples 1' to 5' and 6 to 12, ORMA® lenses were spin-coated on their convex side with an impact-resistant primer coating based on a polyurethane latex comprising polyester moieties, cured at 75° C. for 15 min (Witcobond® 234 purchased from BAXENDEN CHEMICALS, modified by dilution so as to obtain an adequate viscosity, spin coating at 1500 rpm for 10 to 15 seconds). After cooling for 16 min, the primer coating was coated with a polysiloxane-type abrasion- and scratch-resistant coating ("Hard coat"; thickness: 1.8 μm) obtained by curing for 15 min at 75° C. a composition comprising GLYMO (224 parts by weight), DMDES (120 parts by weight), 0.1 N HCl (80.5 parts by weight), colloidal SiO$_2$ (718 parts by weight, containing 30% by weight of nanoparticles in methanol), Al(AcAc)$_3$ (15 parts by weight) as a curing catalyst, a surfactant (0.1 parts by weight of EFKA® 3034 from Ciba Specialty Chemicals) and ethylcellosolve (44 parts by weight). The composition was fast cured for 25 min at 135° C. and let cooled down. The surface of the deposited hard coat was then corona treated and spin-coated at 500/1000 rpm with an antistatic composition, which was pre-cured at 80° C. for 5 minutes and post-cured at 100° C. for 3 hours.

In examples 1 to 5, Airwear® lenses (already provided with a GLYMO-based abrasion- and scratch-resistant coating (~5 microns) but no primer coating) were directly subjected to corona treatment and antistatic coating deposition under the same conditions.

In comparative example C1, no antistatic coating was formed onto the Airwear® lens. In comparative example C2, no antistatic coating was formed onto the coated ORMA® lens, which only contains the same impact-resistant primer coating and the same abrasion- and scratch-resistant coating as in examples 1' to 5' and 6 to 12.

c) Details of Coating Formulations

The coating formulations used in the examples are described in Tables 1 and 2. The figures in the tables are weight percentages.

TABLE 1

| Example | 1 and 1' | 2 and 2' | 3 and 3' | 4 and 4' | 5 and 5' |
|---|---|---|---|---|---|
| GLYMO | 3.200 | 4.000 | 2.400 | 4.000 | 5.200 |
| TEOS | 4.800 | 4.000 | 5.600 | 5.600 | 5.600 |
| 0.1N HCl | 2.392 | 2.300 | 2.484 | 2.852 | 3.128 |
| Methanol | 8.832 | 8.730 | 8.934 | 10.578 | 11.811 |
| CNT dispersion | 80.000 | 80.000 | 80.000 | 76.000 | 73.000 |
| 2-Butanol | 0.544 | 0.680 | 0.408 | 0.680 | 0.884 |
| Al(AcAc)$_3$ | 0.216 | 0.270 | 0.162 | 0.270 | 0.351 |
| Surfactant FC-430 | 0.016 | 0.020 | 0.012 | 0.020 | 0.026 |

TABLE 2

| | Example | | | | | | |
|---|---|---|---|---|---|---|---|
| | 6 | 7 | 8 | 9 | 10* | 11** | 12*** |
| GLYMO | 4.000 | 3.200 | 2.400 | 3.200 | 3.200 | 3.200 | 3.200 |
| 0.1N HCl | 0.920 | 0.736 | 0.552 | 0.736 | 0.736 | 0.736 | 0.736 |
| SnO$_2$ nanoparticles | 14.000 | 16.000 | 18.000 | 12.000 | 0 | 0 | 0 |
| SiO$_2$ nanoparticles | 0 | 0 | 0 | 0 | 12.000 | 12.000 | 12.000 |
| Methanol | 4.110 | 3.288 | 2.466 | 3.288 | 3.288 | 3.288 | 3.288 |
| CNT dispersion | 76.000 | 76.000 | 76.000 | 80.000 | 80.000 | 80.000 | 80.000 |
| 2-Butanol | 0.680 | 0.544 | 0.408 | 0.544 | 0.544 | 0.544 | 0.544 |
| Al(AcAc)$_3$ | 0.270 | 0.216 | 0.162 | 0.216 | 0.216 | 0.216 | 0.216 |
| Surfactant FC-430 | 0.020 | 0.016 | 0.012 | 0.016 | 0.016 | 0.016 | 0.016 |

*15 nm SiO$_2$ nanoparticles were used.
**25 nm SiO$_2$ nanoparticles were used.
***40 nm SiO$_2$ nanoparticles were used.

d) Coating Characteristics and Performances

The thickness of the antistatic coating and performance test data of the prepared optical articles are collected in Tables 3 and 4.

TABLE 3

Film performance tests of coatings (Airwear ® lenses)

| Example | Thickness (nm) | T (%) | Haze | Decay time (ms) | R (Ω/□) | Bayer | Dry adhesion |
|---|---|---|---|---|---|---|---|
| 1 | 691 | 91.2 | 0.13 | 74.1 | 8.01E+10 | 5.83 | 0 |
| 2 | 674 | 91.2 | 0.18 | 58.2 | 4.72E+10 | 5.54 | 0 |
| 3 | 745 | 91.4 | 0.15 | 63.5 | 6.54E+10 | 6.38 | 0 |
| 4 | 923 | 91.2 | 0.12 | 61.7 | 5.67E+10 | 5.98 | 0 |
| 5 | 1046 | 91.3 | 0.08 | 78.2 | 8.97E+10 | 5.30 | 0 |
| C1 | — | 91.5 | 0.13 | 1,450 | 1.38E+13 | 4.65 | 0 |

TABLE 4

Film performance tests of coatings (ORMA ® lenses)

| Example | Thickness (nm) | T (%) | Haze | Decay time (ms) | R (Ω/□) | Bayer | Dry adhesion |
|---|---|---|---|---|---|---|---|
| 1' | 685 | 92.6 | 0.14 | 107 | 3.27E+11 | 5.09 | 0 |
| 2' | 692 | 92.6 | 0.15 | 93.7 | 1.76E+11 | 5.02 | 0 |
| 3' | 731 | 92.5 | 0.17 | 133 | 4.05E+11 | 5.35 | 0 |
| 4' | 944 | 92.5 | 0.16 | 89.6 | 1.67E+11 | 5.21 | 0 |
| 5' | 1024 | 92.4 | 0.17 | 93.7 | 2.62E+11 | 5.33 | 0 |
| 6 | 294 | 92.1 | 0.18 | 135 | 1.25E+11 | 4.62 | 0 |
| 7 | 272 | 91.9 | 0.20 | 137 | 1.56E+11 | 4.55 | 0 |
| 8 | 235 | 91.9 | 0.28 | 166 | 4.67E+11 | 4.52 | 0 |
| 9 | 251 | 91.9 | 0.32 | 98.3 | 4.32E+10 | 4.54 | 0 |
| 10 | 342 | 92.2 | 0.26 | 146 | 1.51E+11 | 4.94 | 0 |
| 11 | 411 | 92.0 | 0.34 | 105 | 8.82E+10 | 5.21 | 0 |
| 12 | 385 | 91.9 | 0.39 | 131 | 1.30E+11 | 5.09 | 0 |
| C2 | — | 92.8 | 0.11 | 181.00 | 3.45E+14 | 3.14 | 0 |

As can be seen from Tables 3 and 4, optical articles coated according to the invention exhibit antistatic properties (surface resistivity $<5 \cdot 10^{11} \Omega/\square$ and short decay time, <150 ms), high optical transparency with about 91-92% of transmittance, low haze (<0.5%), excellent abrasion resistance (ISTM Bayer generally >5) and maintain excellent adhesion to the underlying coating (crosshatch test 0). It is particularly important to note that the bi-layer abrasion-resistant coating/antistatic coating provides better abrasion resistance properties than the sole abrasion-resistant coating.

The invention claimed is:

1. A curable composition, providing, upon curing, an abrasion-resistant, transparent, antistatic coating, wherein the abrasion resistance is characterized by a Bayer value greater than 5, and wherein the coating comprises:
   a) carbon nanotubes, and
   b) a binder comprising at least one compound of formula:

$$R_n Y_m Si(X)_{4-n'-m} \quad (I)$$

or a hydrolyzate thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolyzable groups or hydrogen atoms, m and n' are integers such that m is equal to 1 or 2 and n'+m=1 or 2; and
   c) SiO$_2$ nanoparticles having a diameter of greater than or equal to 25 nm;
wherein the curable composition does not comprise a compound of

$$R_n Si(Z)_{4-n} \quad (II)$$

or a hydrolyzate thereof, in which the R groups are identical or different and represent monovalent alkyl groups, the Z groups are identical or different and represent hydrolyzable groups or hydrogen atoms, and n is an integer equal to 0, 1, or 2.

2. The curable composition of claim 1, wherein the compound of formula I is γ-glycidoxypropyl-trimethoxysilane.

3. The curable composition of claim 1, wherein the diameter of the SiO$_2$ nanoparticles is less than or equal to 40 nm.

4. The curable composition of claim 1, wherein the carbon nanotubes are purified to remove catalyst particles.

5. The curable composition of claim 1, wherein the carbon nanotubes are in a uniform dispersion.

6. The curable composition of claim 1, wherein the SiO$_2$ nanoparticles are in colloidal form.

7. The curable composition of claim 1 further comprising a curing catalyst.

8. The curable composition of claim 7, wherein the curing catalyst is aluminum acetylacetonate or a hydrolyzate thereof.

9. The curable composition of claim 1, wherein the Y groups are independently groups of formulae III and/or IV:

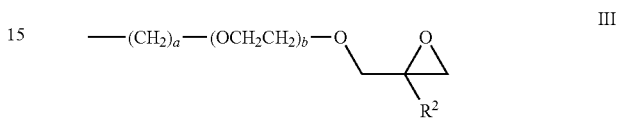

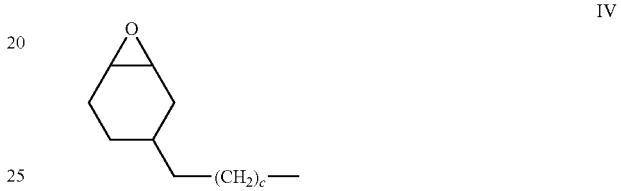

in which R$^2$ is an alkyl group or a hydrogen atom, a and c are integers ranging from 1 to 6, and b is 0, 1, or 2.

10. The curable composition of claim 1, wherein the compound of formula I is an epoxytrialkoxysilane of formula V or VI:

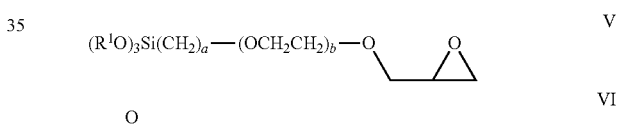

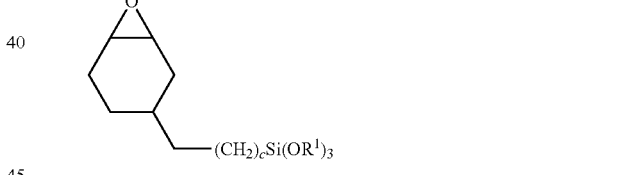

in which R$^1$ is an alkyl group having 1 to 6 carbon atoms, a and c are integers ranging from 1 to 6, and b is 0, 1 or 2.

11. The curable composition of claim 1, further comprising a carbon nanotubes stabilizing agent, wherein the stabilizing agent is chosen from octylphenol ethylene oxide condensates.

12. The curable composition of claim 1, wherein the ratio of (theoretical dry extract weight of nanoparticles)/(theoretical dry extract weight of the composition) is from 25 to 80%.

13. The curable composition of claim 1, wherein the ratio of (theoretical dry extract weight of compound of formula I)/(theoretical dry extract weight of the composition) is from 20 to 100%.

14. The curable composition of claim 1, wherein the ratio of (weight of carbon nanotubes)/(theoretical dry extract weight of binder) is from 0.00025 to 0.01.

15. The curable composition of claim 1, wherein the carbon nanotubes are present in an amount ranging from 0.002 to 0.015% based on the total weight of the composition.

16. A curable composition, providing, upon curing, an abrasion-resistant, transparent, antistatic coating, wherein the abrasion resistance is characterized by a Bayer value greater than 5, and wherein the coating consists of:
   a) carbon nanotubes, and
   b) a binder comprising at least one compound of formula:

$$R_{n'}Y_mSi(X)_{4-n'-m} \quad (I)$$

or a hydrolyzate thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolyzable groups or hydrogen atoms, m and n' are integers such that m is equal to 1 or 2 and n'+m=1 or 2; and
   c) $SiO_2$ nanoparticles having a diameter of greater than or equal to 25 nm;
wherein the curable composition does not comprise a compound of $$Rn'Si(Z)4-n \quad (II)$$

or a hydrolyzate thereof, in which the R groups are identical or different and represent monovalent alkyl groups, the Z groups are identical or different and represent hydrolyzable groups or hydrogen atoms, and n is an integer equal to 0, 1, or 2.

17. A curable composition, providing, upon curing, an abrasion-resistant, transparent, antistatic coating, wherein the abrasion resistance is characterized by a Bayer value greater than 5, and wherein the coating consists of:
   a) carbon nanotubes, and
   b) a binder comprising at least one compound of formula:

$$R_{n'}Y_mSi(X)_{4-n'-m} \quad (I)$$

or a hydrolyzate thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolyzable groups or hydrogen atoms, m and n' are integers such that m is equal to 1 or 2 and n'+m=1 or 2;
   c) $SiO_2$ nanoparticles having a diameter of greater than or equal to 25 nm;
   d) a solvent;
   e) a curing catalyst; and
   f) a surfactant;
wherein the curable composition does not comprise a compound of $$R_nSi(Z)_{4-n} \quad (II)$$

or a hydrolyzate thereof, in which the R groups are identical or different and represent monovalent alkyl groups, the Z groups are identical or different and represent hydrolyzable groups or hydrogen atoms, and n is an integer equal to 0, 1, or 2.

18. An optical article comprising a substrate, and, starting from the substrate:
   a first, silicon-containing, abrasion- and/or scratch-resistant coating having a thickness of at least 1 μm; and
   a 50 nm to 2 μm thick antistatic coating formed by depositing directly onto said abrasion- and/or scratch-resistant coating a curable composition comprising:
   a) carbon nanotubes, and
   b) a binder comprising at least one compound of formula:

$$R_{n'}Y_mSi(X)_{4-n'-m} \quad (I)$$

or a hydrolyzate thereof, in which the R groups are identical or different and represent monovalent organic groups linked to the silicon atom through a carbon atom, the Y groups are identical or different and represent monovalent organic groups linked to the silicon atom through a carbon atom and containing at least one epoxy function, the X groups are identical or different and represent hydrolyzable groups or hydrogen atoms, m and n' are integers such that m is equal to 1 or 2 and n'+m=1 or 2; and
   c) $SiO_2$ nanoparticles having a diameter of greater than or equal to 25 nm; and
wherein the optical article is further defined as having a relative light transmission factor in the visible spectrum Tv higher than 90% and a Bayer value greater than 5;
wherein the curable composition does not comprise a compound of $$R_nSi(Z)_{4-n} \quad (II)$$

or a hydrolyzate thereof, in which the R groups are identical or different and represent monovalent alkyl groups, the Z groups are identical or different and represent hydrolyzable groups or hydrogen atoms, and n is an integer equal to 0, 1, or 2.

19. The optical article of claim 18, wherein the thickness of the antistatic coating is from 100 nm to 1 μm.

* * * * *